April 9, 1963   R. E. RICHARDSON   3,084,526
GLASS BENDING LEHR

Filed Oct. 18, 1956   3 Sheets-Sheet 3

Inventor
Ronald E. Richardson
By Cushman, Darby & Cushman
Attorneys

United States Patent Office 3,084,526
Patented Apr. 9, 1963

3,084,526
GLASS BENDING LEHR
Ronald E. Richardson, Oshawa, Ontario, Canada, assignor to Pittsburgh Plate Glass Company, Pittsburgh, Pa.
Filed Oct. 18, 1956, Ser. No. 616,791
Claims priority, application Canada June 28, 1956
3 Claims. (Cl. 65—268)

This invention relates to improvement in heating lehrs of the type that are employed for carrying out glass bending operations. More particularly the present invention has been developed in connection with lehrs that are employed in the formation of elongated curved glass for use in the manufacture of automobile windshields and rear windows. The bending operation carried out in the lehr forms a preparatory step to the laminating or tempering of such glass to form safety glass.

To bend the glass the conventional practice has been to lay each sheet or pair of sheets of glass on a multi-part skeleton type glass bending mould which is then caused to travel the length of a heating lehr, conveniently on a series of power-driven rollers. Such glass bending moulds may be of the convex or concave type, the preference in the industry being at present towards the use of the concave type. Examples of concave skeleton moulds are described in Canadian patent applications Serial Nos. 688,825/6 and 7 and it is not proposed to explain the details of construction and operation of such moulds in the present specification beyond stating that as the glass is heated in the lehr it softens sufficiently to allow the mould to take up its curved configuration, while the edges of the glass sag down into continuous contact with the side bars of the mould. It is in this manner that a longitudinal curvature is given to the glass.

In the past the design of automobile windshields and rear windows has called only for longitudinal bending of the glass, there having been no significant transverse curvature of the glass in the direction extending from the top to the bottom as mounted in the automobile. No special difficulty has arisen in determining the correct amount of heat to apply to the glass as it travels through the lehr in order readily to permit the longitudinal bending action to take place while ensuring that there is no appreciable sag of the glass in the transverse direction. It will be appreciated that the transverse dimension of the mould is much less than its longitudinal dimension and that therefore a higher temperature than that required for the longitudinal bending would be necessary to cause or permit transverse sagging.

The design of automobile windshields and rear windows has now advanced to the stage where transverse curvature is specifically called for in addition to the longitudinal curvature. To form elongated glass sheets with such compound bends it is desirable to provide additional heat to produce local high temperature areas in the glass, and methods have been developed to accomplish this object. In particular it has been proposed to mount heaters directly on the mould to travel along the lehr with the mould, whereas in the past the heaters have all been fixed to the walls and ceiling of the lehr. By mounting a heater on the mould the source of heat can be brought much closer to the glass but this has been found to lead to difficulty in controlling the amount of transverse sag and ensuring that the final dimensions of the windshield fall within the relatively close tolerances set by the automobile manufacturer. In order to avoid the mould having to be an undue length of time in the lehr, it is desirable to apply the additional local heating comparatively rapidly so that transverse sagging commences quickly and then to arrest such transverse sagging motion sharply once the necessary degree of bending has taken place. This requires comparatively rapid cooling of the glass at a closely controlled point in the operation, i.e. at the time, or just shortly before the time, that the glass has sagged down to the extent necessary to provide the desired transverse curvature.

The foregoing problem is only one of the difficulties presented to the safety glass manufacturer by the modern trend in automobile windshield and rear window designs. Another aspect of these designs is the adoption of shorter and shorter radius bends, that is to say more and more sharply curved contours, whether the bends be compound or not. Like the formation of compound bends, short radius bends also call for more exact control over the temperature of the glass than has previously been required. Such close control needs to be exercised both spatially, that is to say in defining those local areas of glass where certain temperatures are achieved, and temporally in determining at what position in its travel through the lehr the glass is subjected to certain temperature conditions.

Conventional lehrs that have proved satisfactory in the past for bending the glass into comparatively simple shapes with gradual curves are no longer found to be adequate, and it is the principal object of the present invention to provide a lehr in which more exact control of glass temperatures can be obtained. In particular it is an object of the present invention to furnish a lehr with means for subjecting predetermined areas of a glass sheet to predetermined degrees of cooling at predetermined points along the lehr.

An illustrative embodiment of the present invention comprises a bending section of a glass bending lehr comprising an elongated tunnel, means for conveying along said tunnel glass bending moulds supporting elongated glass sheets horizontally thereon, heaters mounted in said tunnel for radiating heat onto said glass sheets, at least two pipes extending through the wall structure of said tunnel, means for supplying cooling fluid under pressure to the end of each said pipe exterior of said tunnel and means for controlling flow of said fluid through each said pipe individually, the ends of said pipes interior of said tunnel being so constructed and arranged that one such pipe directs cooling fluid towards a first portion of a mould-mounted glass sheet during passage along said tunnel and the other pipe directs cooling fluid towards a second portion of said glass sheet during passage along said tunnel, said second portion being displaced horizontally from said first portion in the transverse direction of the tunnel.

The accompanying drawings illustrate by way of example a manner in which a glass bending lehr may be modified in accordance with the present invention.

Figure 1:
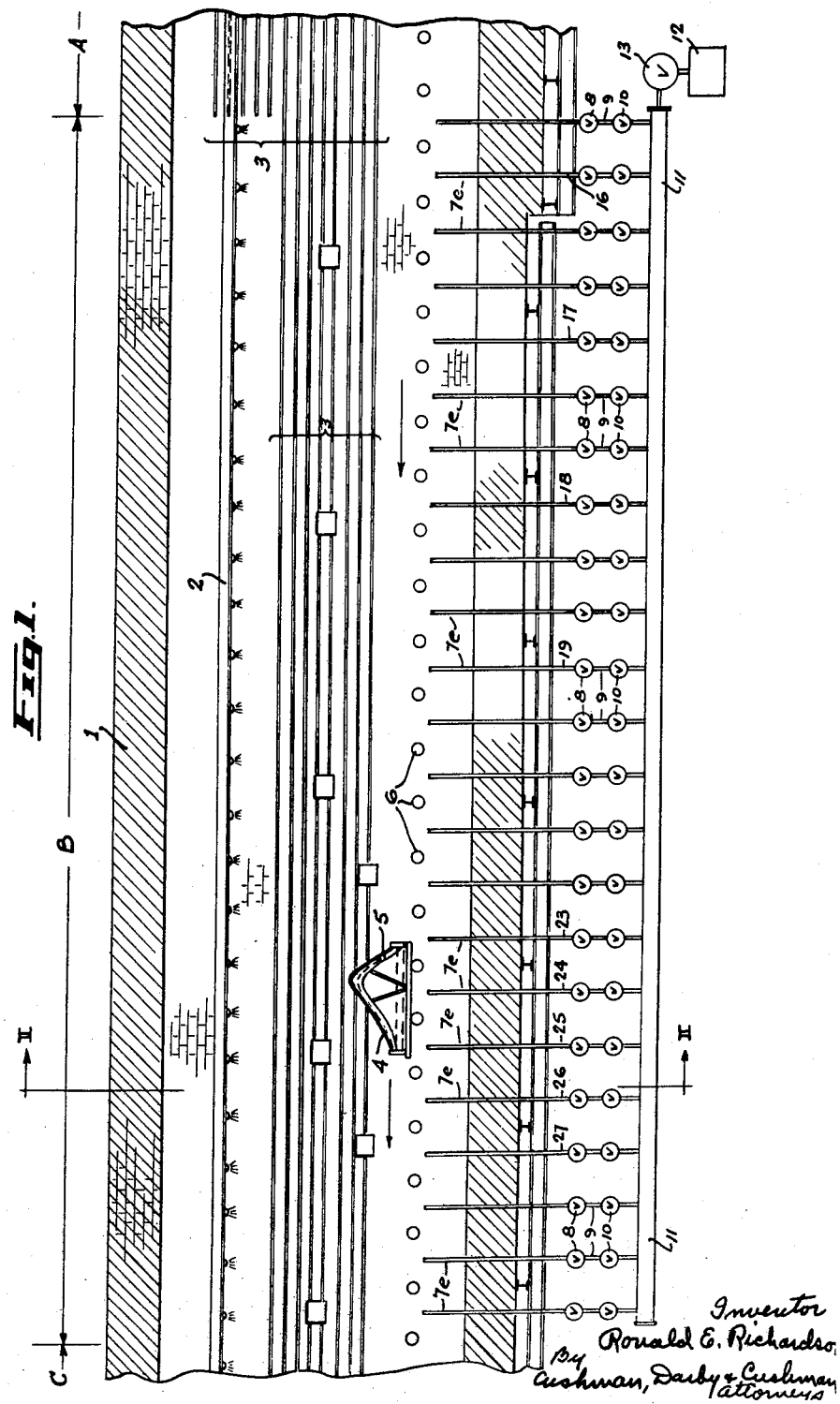
FIGURE 1 shows a longitudinal section of the bending section of the lehr.

The lehr consists basically of an elongated tunnel 1 of fire brick having banks of upper heaters 2 extending along the upper part thereof and arranged to project heat downwardly, and banks of wall heaters 3 recessed in small cavities of the brickwork of the side walls so as to project their heat towards the interior of the tunnel 1. Longitudinally the lehr consists of four sections: pre-heating; bending; annealing; and cooling. In the pre-heating section A, only the end of which is illustrated in FIGURE 1, a maximum number of wall heaters 3 is provided, while in the bending section B the number of wall heaters 3 is reduced. The reference letter C indicates the beginning of the annealing section in which further reduction in the heat supplied to the glass is made. The present invention is concerned solely with the bending section of the lehr.

Figure 2:
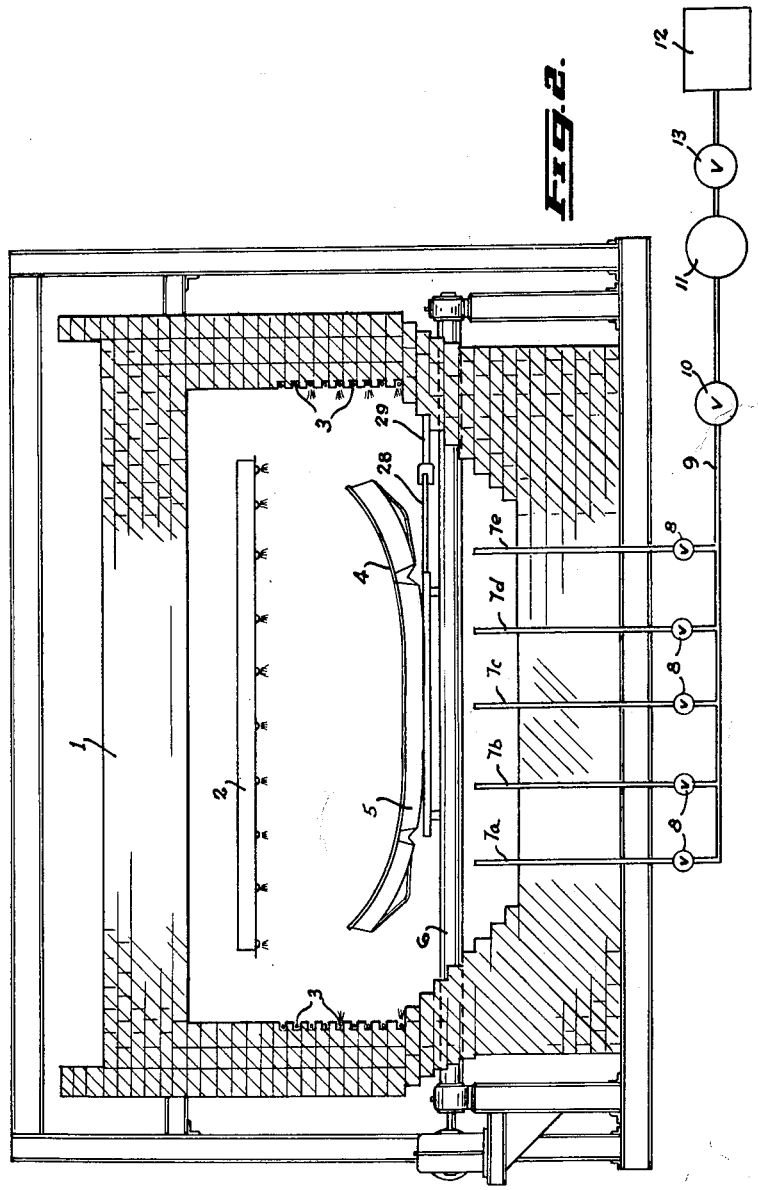
FIGURE 2 shows a transverse section of the lehr seen in FIGURE 1, taken on the line II—II.

Each sheet or pair of sheets of glass 4 to be bent is mounted on a multi-part concave skeleton mould 5, this assembly then being caused to travel the length of the lehr from right to left as seen in FIGURE 1 by means of a series of power-driven rollers 6. A typical mould shown in transit along the lehr and with the glass already bent to curved form is seen in FIGURES 1 and 2. In practice, of course, a number of such moulds will travel along the lehr closely behind one another.

The arrangement of the lehr so far described is conventional and the present invention consists of the introduction into the bending section of the lehr of localized cooling means for cooling selected areas of each sheet of glass as the mould on which it is supported enters this area. Such cooling means are provided in the form of a longitudinal series of transversely extending rows of air pipes 7a, 7b, 7c, 7d and 7e that project upwardly through the brickwork of the floor of the tunnel 1 to terminate at points slightly below the lower level of the rollers 6.

Each of the cooling pipes 7a–e is separately supplied with cooling air so that entirely independent operation can be achieved. For this purpose a manually operable valve 8 is positioned in each of the cooling pipes. These valves are shown in the drawings diagrammatically and beneath the floor of the lehr. It is to be understood that means will be provided for controlling these valves from a more convenient position at the side of the lehr or on a separate control panel. All the primary valves 8 of a single row of air pipes 7a–e are supplied from an individual branch air supply pipe 9. Flow of air to each branch supply pipe 9 is in turn controlled by separate solenoid-operated overriding valves 10 which serve to connect such branch supply pipes 9 to a main air supply pipe 11 which in turn receives air from a reservoir 12 through a main reducing valve 13. By individual control of the valves 8 and 10 each of the air pipes can be independently operated.

Those air pipes that are chosen to blow cooling air onto the glass in any one operation will differ depending upon the circumstances. It will be understood that only a comparatively small number of cooling pipes will be in operation at one time, otherwise the overall temperature conditions of the lehr would be likely to be unbalanced. In general the effect of those of the air pipes situated towards the entrance end of the bending section B of the lehr, i.e. to the right of FIGURE 1, will be to inhibit or wholly prevent bending of the glass in those localized areas on which the cool air plays. On the other hand the pipes at the other end of the bending section B of the lehr, that is towards the annealing section C, will tend to act more to check bending that has already begun. In other words those pipes at the beginning of the bending section will check the commencement of bending, whereas those in the later part of the bending section will check the continuance of bending.

Figure 3:
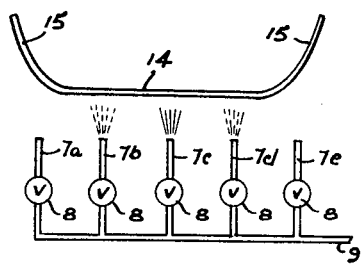
FIGURES 3, 4 and 5 are diagrammatic representations illustrating the manner of operation of this lehr under three different sets of conditions.
Figure 4:
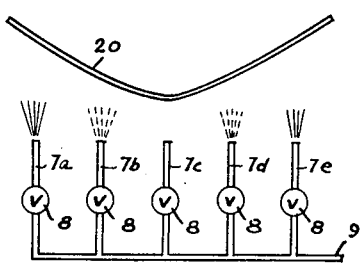

An example of a situation where the first type of operation would be required is in the formation of a windshield having a relatively flat portion in one part and a relatively short radius bend in another part. FIGURES 3 and 4 illustrate two different possibilities in this category. FIGURE 3 shows a windshield 14 having a very flat central portion and sharply bent-around wing portions 15. In this case comparatively intense heating would be applied to the ends of the glass in order to permit the formation of such sharp bends, but it would be desirable to keep the centre of the glass comparatively cool in order to avoid any sagging in the transverse direction. In bending glass for a windshield of this type in a lehr according to the present invention air would be supplied to the central air pipes 7c, as shown in FIGURE 3. Depending on the intensity of cooling required the intermediate pipes 7b and 7d may also be operated, as suggested by the air jets shown in broken lines in FIGURE 3. The pipes chosen for operation will be in the area of the early part of the bending section B of the lehr. Since it is not desired that a large volume of cooling air be injected into the lehr by this method, the pipes 7c (and 7b and 7d if used) would not likely be operated in each row of pipes. By way of example those pipes in every third row, say the rows 16, 17, 18 and 19 (FIGURE 1) might be operated to inhibit bending over the central portion of the windshield 14.

The reverse conditions, where the central portion of the windshield is formed with a sharp bend whereas the wing portions are comparatively gradually bent, are demonstrated by the windshield 20 in FIGURE 4. In this case it will be the outer ends of the glass that will require additional cooling so that pipes 7a and 7e will be put into operation. Possibly as suggested by the broken line air jets in FIGURE 4 the intermediate pipes 7b and 7d may also be used. Again rows of pipes such as rows 16, 17, 18 and 19 situated near the entrance end of the bending section B of the lehr will be those in which the selected air pipes are operated.

Figure 5:
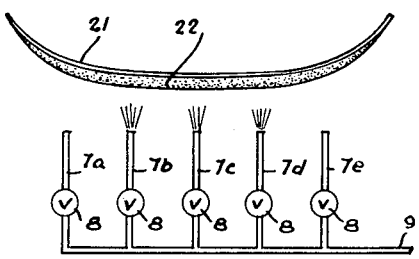

The air pipes towards the later part of the bending section B of the lehr will be employed when it is desired that the cooling air should act to produce a sudden temperature change to check some bending that has already commenced. The most probable example of an instance falling in this category is the formation of a compound bend in which the glass will have a degree of transverse sag. FIGURE 5 illustrates a windshield 21, the longitudinal central part of which sags down between the two side bars of the mould in a central area 22. Since this central area 22 does not normally come into contact with any of the mould parts, there will be no physical means of limiting the downward movement of the glass. As explained above it is important to insure that this sagging effect takes place to a closely controlled extent and this is a function to which the air pipes of the present invention are especially suited. Central pipes 7b, 7c and 7d will then be operated in a concentrated group, say rows 23, 24, 25, 26 and 27 situated towards the later end of the bending section B of the lehr.

Since it is undesirable to introduce any more cooling air into the lehr than is required to exert the necessary cooling action on the glass sheets as they travel along the lehr, it will be preferable not to maintain the selected air pipes operative continuously, but rather to open and close the required valves periodically in accordance with the position of the glass bending moulds in the lehr. Thus, as each mould passes over a selected row of pipes (say the row 18) the appropriate valve 10 will be turned on; and as soon as the mould has travelled beyond a point directly above the air pipes in such row, the valve will be immediately turned off. At about this time the next row to be operated, say the row 19, will be turned on, while the pipes in the row 18 will remain inoperative until the next mould is in position over such row or is just about to enter such position. This on and off operation will be carried out by the solenoid-operated valves 10 once the individual valves 8 have been initially set in the required pattern. It will be a simple matter to arrange for such solenoid-operated valves 10 to be operated automatically by the travel of the moulds. For example each mould can carry an arm 28 (FIGURE 2) positioned to cooperate with a stationary part 29 of the mould to close an electrical contact while the mould is traversing that short length of the lehr during which it is above the given row of air pipes. Each row will have an independent electrical system of this type controlling the operation of the corresponding valve 10 which will then be actuated each time a mould is in register with the row concerned, provided a circuit to such valve has been established on the control panel during setting of the cooling pattern required.

The illustrated arrangement of conduits projecting upwardly from the floor of the tunnel has been chosen principally for convenience of construction. Provided such conduits can be disposed so as not to interfere with the heaters, they may be arranged at the side of the tunnel or even projecting downwardly from the ceiling of the tunnel. The essential requirement is that they each extend through the wall structure of the tunnel (the "wall structure" comprising the floor, side walls and ceiling of the tunnel) and direct their cooling air towards the position occupied by a selected local area of hot glass at a selected position along the lehr.

I claim:
1. A bending section of a glass bending lehr comprising an elongated tunnel, means for moving through said tunnel glass bending moulds supporting elongated glass sheets horizontally thereon with the longitudinal axis of each glass sheet extending transversely to the direction of movement of said glass sheets through said tunnel, heaters mounted in said tunnel for radiating heat onto said glass sheets, at least two pipes extending through the wall structure of said tunnel, each of said pipes having an end interior of said tunnel and an end exterior of said tunnel, means for supplying cooling fluid under pressure to the end of each of said pipe exterior of said tunnel and means for controlling flow of said fluid through each said pipe individually, the ends of said pipes interior of said tunnel being spaced from each other transversely of the direction of movement of the glass sheets through the tunnel and positioned to be spanned by each glass sheet as the glass sheets are moved through the tunnel.

2. A bending section of a glass bending lehr comprising an elongated tunnel, means for moving through said tunnel glass bending moulds supporting elongated glass sheets horizontally thereon with the longitudinal axis of each glass sheet extending transversely to the direction of movement of said glass sheets through said tunnel, heaters mounted in said tunnel for radiating heat onto said glass sheets, a plurality of at least three pipes extending through the wall structure of said tunnel, each of said pipes having an end interior of said tunnel and an end exterior of said tunnel, means for supplying cooling fluid under pressure to the end of each said pipe exterior of said tunnel and means for controlling flow of said fluid through each said pipe individually, the ends of said pipes interior of said tunnel being arranged in at least one row spaced from each other transversely of the direction of movement of the glass sheets through the tunnel and positioned to be spanned by each glass sheet as the sheets are moved through said tunnel, the pipes at the ends of said row being so constructed and arranged as to project cooling fluid towards a respective end of said glass sheet and each pipe intermediate said end pipes being so constructed and arranged as to project cooling fluid towards a corresponding intermediate portion of said glass sheet.

3. A bending section of a glass bending lehr according to claim 2 wherein said pipes extend through the floor of said tunnel and project upwardly to direct said cooling fluid onto the under surface of said glass sheet.

References Cited in the file of this patent

UNITED STATES PATENTS

| | | |
|---|---|---|
| 1,756,244 | Howard | Apr. 29, 1930 |
| 1,809,534 | Tillyer et al. | June 9, 1931 |
| 1,895,547 | Lebel | Jan. 31, 1933 |
| 2,137,061 | Quentin | Nov. 15, 1938 |
| 2,199,511 | Perry et al. | May 7, 1940 |
| 2,203,182 | Rendall | June 4, 1940 |
| 2,248,714 | Lytle | July 8, 1941 |
| 2,348,278 | Boyles et al. | May 9, 1944 |
| 2,671,988 | Walters | Mar. 16, 1954 |
| 2,766,555 | Jendrisak et al. | Oct. 16, 1956 |